US011029792B2

(12) United States Patent
Zhao et al.

(10) Patent No.: US 11,029,792 B2
(45) Date of Patent: Jun. 8, 2021

(54) SENSOR AND TOUCH SCREEN DISPLAY

(71) Applicant: SHENZHEN GOODIX TECHNOLOGY CO., LTD., Guangdong (CN)

(72) Inventors: Feng Zhao, Shenzhen (CN); Feng Liu, Shenzhen (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/436,730

(22) Filed: Jun. 10, 2019

(65) Prior Publication Data

US 2019/0294301 A1 Sep. 26, 2019

Related U.S. Application Data

(63) Continuation of application No. PCT/CN2018/077397, filed on Feb. 27, 2018.

(51) Int. Cl.
 *G06F 3/044* (2006.01)
(52) U.S. Cl.
 CPC .. *G06F 3/0445* (2019.05); *G06F 2203/04102* (2013.01)
(58) Field of Classification Search
 CPC ............. G06F 3/0445; G06F 2203/04102
 See application file for complete search history.

(56) References Cited

U.S. PATENT DOCUMENTS

| 10,126,863 | B2 * | 11/2018 | Noguchi | G06F 3/044 |
| 10,289,210 | B1 * | 5/2019 | Wang | G06F 3/0447 |
| 10,585,482 | B2 * | 3/2020 | Wen | G06F 3/0416 |
| 10,826,017 | B2 * | 11/2020 | Yu | G02F 1/133305 |

(Continued)

FOREIGN PATENT DOCUMENTS

| CN | 204883664 U | 12/2015 |
| CN | 107704120 A | 2/2018 |

OTHER PUBLICATIONS

International Search Report mailed in International Patent Application No. PCT/CN2018/077397, filed on Feb. 27, 2018, 4 pages.

(Continued)

*Primary Examiner* — Sejoon Ahn
(74) *Attorney, Agent, or Firm* — Davis Wright Tremaine LLP (57) ABSTRACT

The present disclosure provides a sensor and a touch screen display. The sensor includes: a plurality of touch units, each of which including: a plurality of driving electrodes and a plurality of sensing electrodes. The driving electrodes in each touch unit are arranged in at least two different directions, and some of the driving electrodes in each touch unit are arranged in a first direction, while some of the driving electrodes in each touch unit are arranged in a second direction. The sensing electrodes in each touch unit are arranged in at least two different directions, and some of the sensing electrodes in each touch unit are arranged in the first direction, while some of the sensing electrodes in each touch unit are arranged in the second direction. The driving electrodes in each touch unit are electrically connected, and the sensing electrodes in each touch unit are electrically connected.

20 Claims, 11 Drawing Sheets

(56) References Cited

U.S. PATENT DOCUMENTS

| | | | | |
|---|---|---|---|---|
| 2008/0246496 A1* | 10/2008 | Hristov | G06F 3/044 | 324/686 |
| 2008/0303782 A1* | 12/2008 | Grant | G06F 1/1615 | 345/156 |
| 2011/0157079 A1* | 6/2011 | Wu | G06F 3/044 | 345/174 |
| 2012/0062250 A1 | 3/2012 | Kuo | | |
| 2012/0249454 A1* | 10/2012 | Teraguchi | G06F 3/0445 | 345/173 |
| 2013/0127770 A1* | 5/2013 | Trend | G06F 3/044 | 345/174 |
| 2013/0127776 A1* | 5/2013 | Guard | G06F 1/1652 | 345/174 |
| 2013/0141357 A1* | 6/2013 | Lo | G06F 3/0446 | 345/173 |
| 2013/0242485 A1 | 9/2013 | Ohtani et al. | | |
| 2014/0111464 A1* | 4/2014 | Bakken | G06F 3/044 | 345/174 |
| 2014/0139481 A1* | 5/2014 | Han | G06F 3/044 | 345/174 |
| 2014/0327649 A1* | 11/2014 | Lee | G06F 3/044 | 345/174 |
| 2015/0015517 A1* | 1/2015 | Zhao | G06F 3/044 | 345/173 |
| 2015/0022494 A1* | 1/2015 | Azumi | G06F 3/044 | 345/174 |
| 2015/0097801 A1* | 4/2015 | Trend | H05K 3/146 | 345/174 |
| 2015/0242017 A1* | 8/2015 | Liao | G06F 3/044 | 345/174 |
| 2016/0202802 A1 | 7/2016 | Ono et al. | | |
| 2016/0253036 A1* | 9/2016 | Yang | G09G 3/20 | 345/174 |
| 2017/0205926 A1* | 7/2017 | Noguchi | G02F 1/133305 | |
| 2017/0205928 A1* | 7/2017 | Noguchi | G06F 3/04166 | |
| 2017/0344165 A1* | 11/2017 | Heo | H01L 51/0097 | |
| 2017/0371448 A1* | 12/2017 | Toyota | G06F 3/044 | |
| 2018/0308903 A1* | 10/2018 | Jeong | H01L 27/323 | |
| 2019/0102027 A1* | 4/2019 | Yoo | G06F 3/0414 | |
| 2020/0042117 A1* | 2/2020 | Li | H01L 27/323 | |

OTHER PUBLICATIONS

Extended European Search Report dated Jan. 23, 2020, Patent Application No. 18884834.5-1231, filed Jun. 10, 2019, 8 pages.

* cited by examiner

SENSOR AND TOUCH SCREEN DISPLAY

CROSS-REFERENCE TO RELATED APPLICATIONS

The present application is a continuation of international application No. PCT/CN2018/077397, filed on Feb. 27, 2018, which is hereby incorporated by reference in its entirety.

TECHNICAL FIELD

The present disclosure relates to the field of touch screen technology, particularly, to a sensor and a touch screen display.

BACKGROUND

Flexible screens are characterized by low power consumption and bendability. As science and technology are developing, flexible screens may be widely applied to portable terminal devices such as foldable mobile phones and wearable devices in the near future. A flexible screen applied to a mobile terminal is added with functions such as touch to form a flexible touch screen display, which refers to a screen that simultaneously achieves a touchable function on a flexible (bendable, foldable) display screen.

As the market is increasingly requiring thinner but more integrated touchable screen displays, a design of simply thinning a screen according to a conventional detection method of capacitive touch control solution has encountered bottlenecks in signal detection. Therefore, an improvement on design of sensors is becoming more urgent and difficult.

SUMMARY

Some embodiments of the present disclosure are directed to provide a sensor and a touch screen display, with enhanced touch sensitivity.

An embodiment of the present disclosure provides a sensor including: a plurality of touch units, each touch unit including: a plurality of driving electrodes and a plurality of sensing electrodes. The driving electrodes in each touch unit are arranged in at least two different directions, some of the driving electrodes in each touch unit are arranged in a first direction, and some of the driving electrodes in each touch unit are arranged in a second direction. The sensing electrodes in each touch unit are arranged in at least two different directions, some of the sensing electrodes in each touch unit are arranged in the first direction, and some of the sensing electrodes in each touch unit are arranged in the second direction. The driving electrodes in each touch unit are electrically connected, and the sensing electrodes in each touch unit are electrically connected.

An embodiment of the present disclosure further provides a touch screen display including the above-described sensor.

Compared with the existing technology, in the embodiments, each touch unit is provided with the plurality of driving electrodes and the plurality of sensing electrodes, with the plurality of driving electrodes being electrically interconnected to form a large driving electrode, and the plurality of sensing electrodes being electrically interconnected to form a large sensing electrode. In terms of coupling effect, since each driving electrode is coupling with sensing electrodes, the coupling effect among the driving electrodes and the sensing electrodes are strengthened for the touch unit as a whole, thereby improving touch sensitivity of the sensor and of the touch screen display in the embodiments. By arranging the driving electrodes and the sensing electrodes in at least two directions respectively, more electrodes can be arranged in the same area, thereby strengthening the coupling effect and further improving the touch sensitivity.

As a further development, the driving electrodes arranged in a predetermined direction are arranged alternately with the sensing electrodes arranged in the same direction as the predetermined direction, the predetermined direction being the first direction or the second direction. This embodiment further defines that the driving electrodes and the sensing electrodes are arranged alternately such that the driving electrodes and the sensing electrodes are closer, thereby further strengthening the coupling effect among the driving electrodes and the sensing electrodes.

As a further development, that the driving electrodes are arranged alternately with the sensing electrodes specifically refers to: any one of the driving electrodes is followed by one of the sensing electrodes and vice versa; or, any two neighboring driving electrodes are followed by two neighboring sensing electrodes and vice versa. This embodiment further defines the alternate arrangement manner of the driving electrodes and the sensing electrodes by providing multiple arrangement manners, so as to be adaptive to requirements of different electrode layouts and different application scenarios to facilitate promotion of this disclosure.

As a further development, that the driving electrodes are arranged alternately with the sensing electrodes specifically refers to: any one driving electrode arranged in the first direction is followed by one sensing electrode arranged in the first direction and vice versa, and any two neighboring driving electrodes arranged in the second direction are followed by two neighboring sensing electrodes arranged in the second direction and vice versa; or, any two neighboring driving electrodes arranged in the first direction are followed by two neighboring sensing electrodes arranged in the first direction and vice versa, and any one driving electrode arranged in the second direction is followed by one sensing electrode arranged in the second direction and vice versa. This development further defines that any one driving electrode is followed by one sensing electrode and vice versa in one direction, while any two neighboring driving electrodes are followed by two neighboring sensing electrodes and vice versa in the other direction, bringing about more arrangement manners that meet requirements of different electrode layouts, and further satisfying multiple application scenarios to facilitate promotion of this disclosure.

As a further development, all driving electrodes and sensing electrodes in the same direction are arranged in parallel. This embodiment defines that driving electrodes and sensing electrodes in the same direction are arranged in parallel, to facilitate design on layouts of electrodes.

As a further development, all driving electrodes in the same direction are evenly arranged and/or all sensing electrodes in the same direction are evenly arranged. This embodiment defines that the electrodes are arranged evenly so that detectability of the sensor is even.

As a further development, the driving electrodes and the sensing electrodes are strip-shaped or elongated-comb-tooth-shaped. This embodiment defines multiple shapes of electrodes to meet different requirements for layouts of electrodes.

As a further development, a coupling distance between the driving electrode and the sensing electrode is a first distance, where the sensing electrode is arranged closest to and in the same direction as the driving electrode; the first distance is greater than zero but smaller than or equal to a preset value. This embodiment defines a smaller coupling distance, which further ensures a coupling effect between neighboring driving electrode and sensing electrode.

As a further development, at least two said first distances are different. This embodiment defines that said first distances may be varied, which facilitates different requirements for layouts of electrodes.

As a further development, locations arranged for the driving electrodes and the sensing electrodes are related to locations of illuminants; the illuminants refer to illuminants disposed on a display layer corresponding to the sensor. This embodiment defines that the locations arranged for the electrodes are related to the locations of the illuminants, thus preventing interference between the electrodes and the illuminants.

As a further development, the driving electrodes and the sensing electrodes are non-transparent layers, and the driving electrodes and the sensing electrodes are arranged in spaces between the illuminants. This embodiment defines that non-transparent driving electrodes and sensing electrodes are arranged in spaces between the illuminants, to prevent Moire fringes from being generated due to overlapping of electrodes with illuminants.

As a further development, one said space is arranged with one of the driving electrodes and one of the sensing electrodes. This embodiment further defines that two electrodes of different types may be arranged in one space, so that the driving electrode and the sensing electrode are as close as possible, thereby enhancing coupling effect.

As a further development, a width of the driving electrode or a width of the sensing electrode is smaller than or equal to half a width of the space. This embodiment defines that a width of the driving electrode and a width of the sensing electrode are as small as possible, thereby decreasing capacitance between a human hand and the driving/sensing electrode, reducing weakening effect of a parasitic capacitance on a detection signal, decreasing capacitance between the driving/sensing electrode and a common electrode of the display screen, and lowering requirements for driving capability of a touch and control chip (IC).

As a further development, the driving electrodes are arranged at a first electrode layer, and the sensing electrodes are arranged at a second electrode layer, with the first electrode layer being distinguished from the second electrode layer. Alternately, the driving electrodes and the sensing electrodes are arranged at the same electrode layer, with an insulating layer being arranged at an intersection between the driving electrode and the sensing electrode. This embodiment further defines a layout of the electrodes in that the driving electrodes and the sensing electrodes may be arranged in different manners to meet different requirements. It is defined that the driving electrodes and the sensing electrodes that are intersected on the same electrode layer are bridged to avoid detection mistakes caused by a connection of electrodes of two different types.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

In order to make the purpose, the technical solution and the advantages of this disclosure clearer, some embodiments of the present disclosure will be explained below in detail with reference to the accompanying drawings and embodiments. It should be understood that the specific embodiments described herein only explain the disclosure but do not limit the disclosure.

After analyzing the existing technology, the inventors of the present disclosure find that at least the following problems exist in the existing technology: compared with a conventional mutual capacitance touch screen display, a cover plate and a display layer of a flexible touch screen display are relative thinner, thereby a distance between a touch screen and a human hand is shorter. When touching, a parasitic capacitance between the human hand and a sensing electrode/driving electrode of a sensor is strengthened, thus a detection signal is weakened, the touch detection is insensitive and the touch effect is poor.

Figure 1:
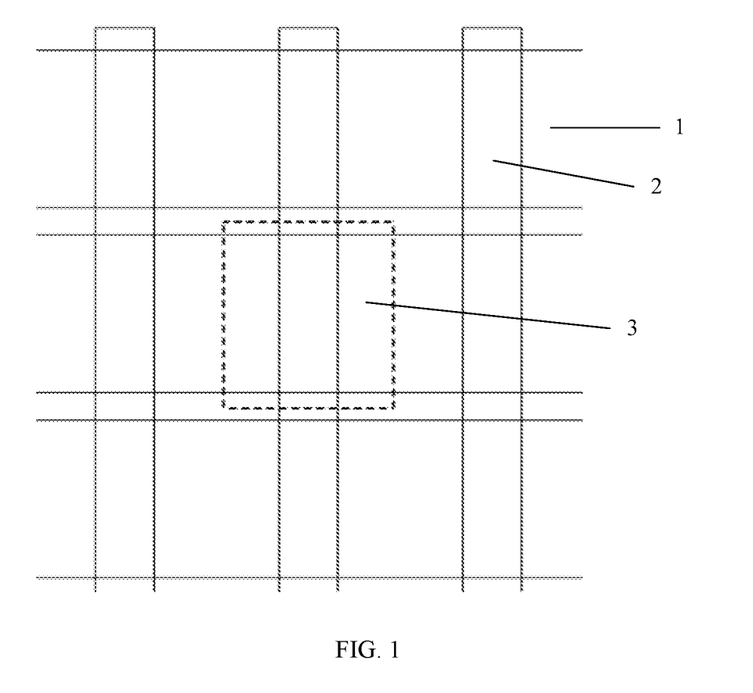
FIGS. 1 and 2 are schematic diagrams of two types of sensors respectively in the background technology of the present disclosure.
Figure 2:
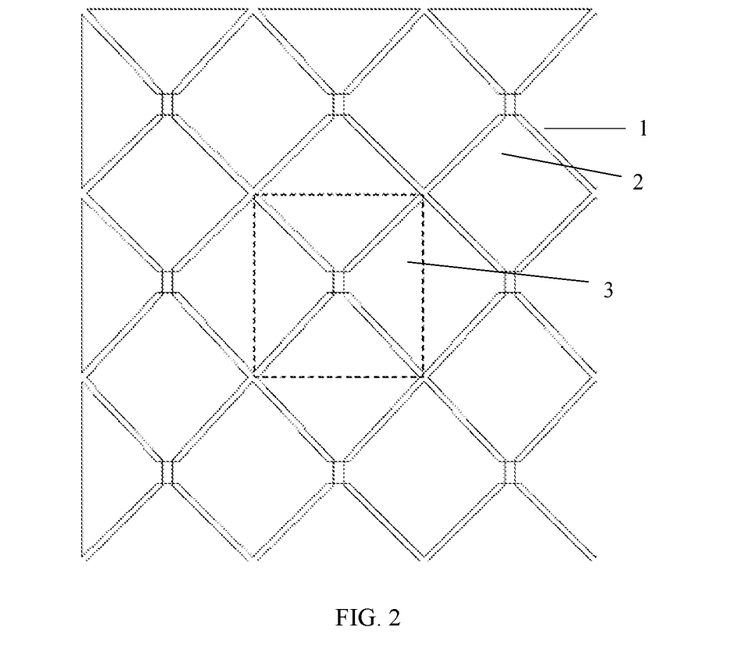

A touch layer portion includes a plurality of repeatedly arranged touch units 3, each touch unit 3 including a mutual capacitance detection channel consisting of a driving channel 1 and a sensing channel 2, as shown by dashed boxes in FIGS. 1 and 2.

Figure 10A:
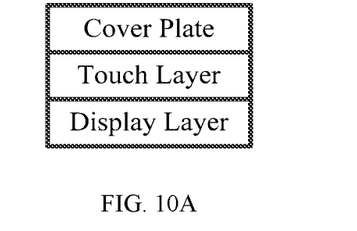
FIG. 10A is another schematic diagram of a touch screen display according to the present disclosure.
Figure 10B:
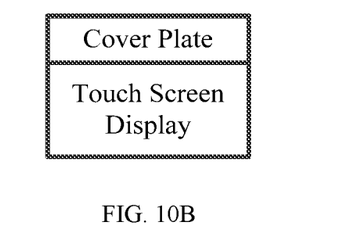
FIG. 10B is a schematic diagram of another touch screen display according to the present disclosure.

An embodiment of the present disclosure relates to a sensor. The sensor in this embodiment may be applied to a touch screen display, and the structure of the touch screen display may be shown as FIG. 10A or FIG. 10B. The touch screen display in FIG. 10A is consisted of a cover plate, a touch layer and a display layer from top to bottom. The touch layer is provided with sensors, each of the sensors includes a plurality of touch units arranged in array. The display layer is provided with illuminants (such as LEDs), and the display layer may be a flexible display layer. In FIG. 10B, the display layer may be embedded with driving electrode and sensing electrodes, to form a touch display layer. In this embodiment, the structure of each of the touch units is described in detail.

Figure 3:
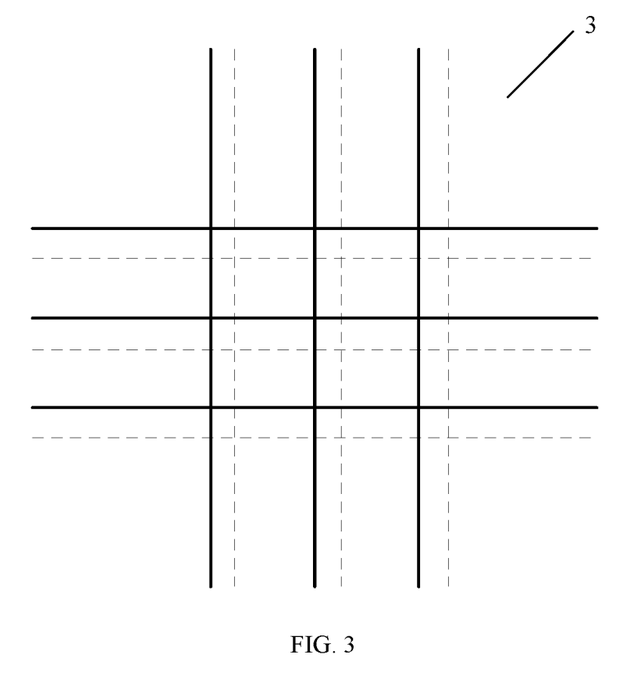
FIG. 3 is a schematic diagram of a touch unit in a sensor according to the present disclosure.

FIG. 3 shows a structure of each touch unit in this embodiment. Generally, the touch unit specifically includes: a plurality of driving electrodes (solid lines) and a plurality of sensing electrodes (dashed lines). The driving electrodes in each touch unit are arranged in at least two different directions, and some of the driving electrodes in the touch unit are arranged in a first direction, while some of the driving electrodes in the touch unit are arranged in a second direction. The sensing electrodes in each touch unit are arranged in at least two different directions, and some of the sensing electrodes in the touch unit are arranged in the first direction, while some of the sensing electrodes in the touch unit are arranged in the second direction. The driving electrodes in each touch unit are electrically connected, and the sensing electrodes in each touch unit are electrically connected.

Figure 4A:
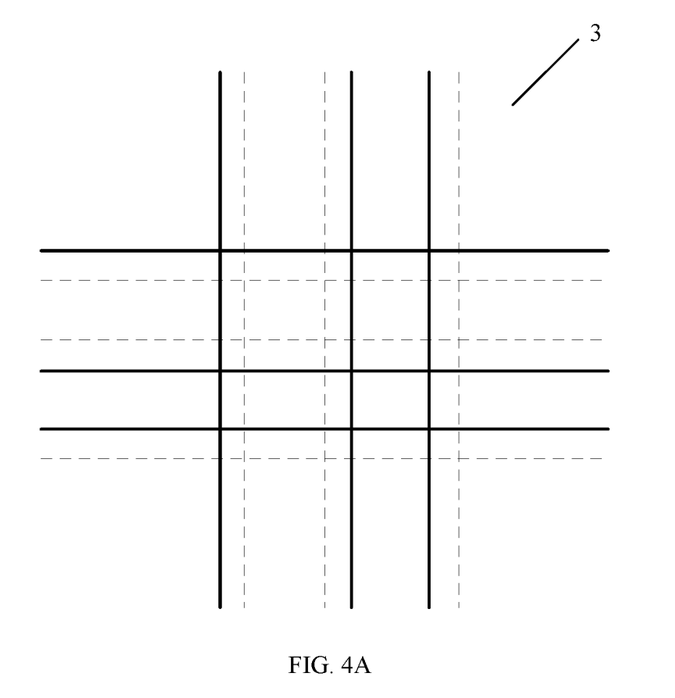
FIGS. 4A and 4B are schematic diagrams of a touch unit in another sensor according to the present disclosure.
Figure 4B:
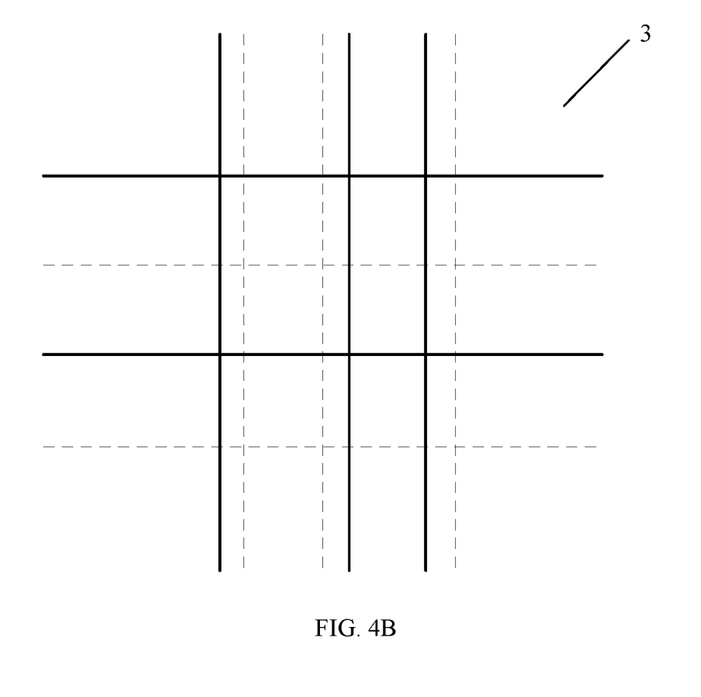

Specifically, the driving electrodes arranged in a predetermined direction are arranged alternately with the sensing electrodes arranged in the same direction as the predetermined direction, the predetermined direction is the first direction or the second direction. It is seen from the electrodes arranged in the vertical direction that from left to right there are a driving electrode-a sensing electrode-a driving electrode-a sensing electrode-a driving electrode-a sensing electrode, while it is seen from the electrodes arranged in the horizontal direction that from top to bottom there are a driving electrode-a sensing electrode-a driving electrode-a sensing electrode-a driving electrode-a sensing electrode. It can be seen from FIG. 3 of this embodiment that any one of the driving electrodes is followed by one of the sensing electrodes and vice versa. It is worth mentioning that, in practical applications, any two neighboring driving electrodes may be followed by two neighboring sensing electrodes and vice versa. As shown in FIG. 4A, it is seen from the electrodes arranged in the vertical direction that from left to right there are a driving electrode-a sensing electrode-a sensing electrode-a driving electrode-a driving electrode-a sensing electrode, while it is seen from the electrodes arranged in the horizontal direction that from top to bottom there are a driving electrode-a sensing electrode-a sensing electrode-a driving electrode-a driving electrode-a sensing electrode. Further, in practical applications, the driving electrodes and the sensing electrodes may be arranged as shown in FIG. 4B: it is seen from the electrodes arranged in the vertical direction that from left to right there are a driving electrode-a sensing electrode-a sensing electrode-a driving electrode-a driving electrode-a sensing electrode, while it is seen from the electrodes arranged in the horizontal direction that from top to bottom there are a driving electrode-a sensing electrode-a driving electrode-a sensing electrode. In this way, electrodes have lower density in horizontal, which is suitable for cases where space for arranging said electrodes is small.

It is seen from FIGS. 3, 4A, and 4B that driving electrodes and sensing electrodes arranged in the same direction may be arranged in parallel. Besides, the driving electrodes arranged in the same direction are disposed evenly, and the sensing electrodes arranged in the same direction are disposed evenly.

Further, as shown in FIG. 4B, for the driving electrodes and sensing electrodes in the first direction, any one driving electrode is followed by one sensing electrode and vice versa; for the driving electrodes and sensing electrodes in the second direction, any two neighboring driving electrodes are followed by two neighboring sensing electrodes and vice versa. In other words, any one driving electrode arranged in the first direction is followed by one sensing electrode arranged in the first direction and vice versa, any two neighboring driving electrodes arranged in the second direction are followed by two neighboring sensing electrodes arranged in the second direction and vice versa. Alternately, any two neighboring driving electrodes arranged in the first direction are followed by two neighboring sensing electrode arranged in the first direction and vice versa, any one driving electrode arranged in the second direction is followed by one sensing electrode and vice versa.

It shall be noted that locations arranged for the driving electrodes and the sensing electrodes are related to locations of illuminants, where the illuminants are on a display layer corresponding to the sensor. In other words, spaces between the electrodes are related to a resolution of the display, and the distances between two neighboring electrodes may either equal or not, and the present disclosure is not limited thereto.

Figure 5:
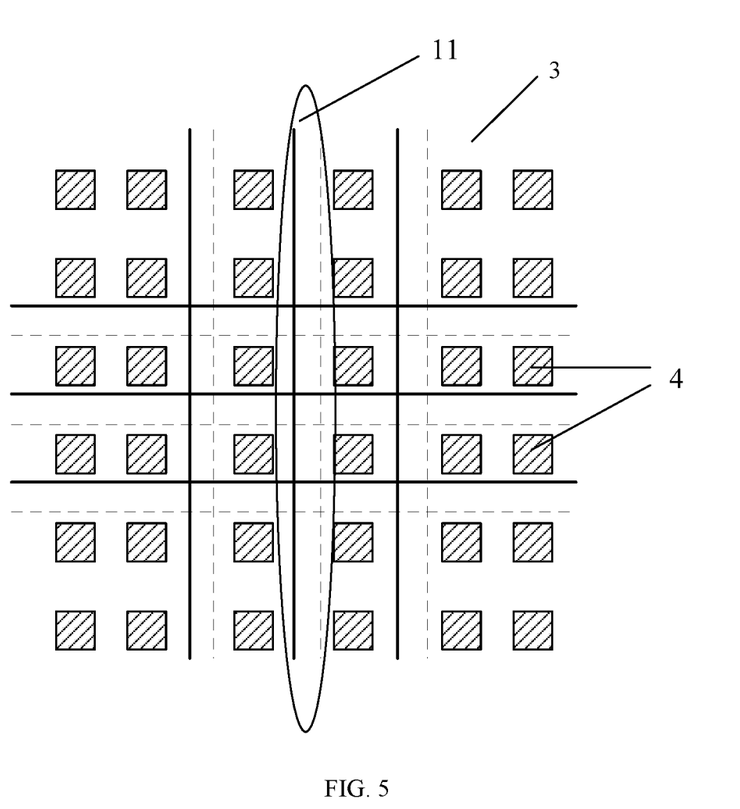
FIG. 5 is a schematic diagram of the touch unit in the sensor according to the present disclosure.

Further, the electrodes may be made of metal (e.g., a conventional metal material). The driving electrodes and the sensing electrodes may respectively form a metal mesh, the driving electrodes and the sensing electrodes are non-transparent layers. As shown in FIG. 5, the driving electrodes and the sensing electrodes are arranged in spaces between the illuminants 4 (shaded portions in the figure), that is, the driving electrodes and the sensing electrodes are located between neighboring sub-pixels of the display screen, thereby preventing the sensor from being overlapped with pixels, which may effectively avoid Moire fringes (Moire fringe: a visual result of interference between two lines or two objects at a constant angle and frequency; when a human's eyes fails to distinguish the two lines or the two objects, only the interference fringes may be seen; the fringe in the optical phenomenon is referred as the Moire fringes).

It shall be further noted that in this embodiment, the driving electrodes and the sensing electrodes are strip-shaped, and their widths may be less than half of a space between the illuminators, that is, one driving electrode and one sensing electrode may be simultaneously arranged in one space. As shown in the elliptical ring 11, one driving electrode and one sensing electrode are simultaneously arranged in the space.

In practical applications, the electrodes may be made of transparent material, such as nano silver or graphene or the like, which is not enumerated herein.

In addition, widths of the electrodes may be related to a thickness of the cover plate. In general, a width of an electrode may be less than or equal to 0.3 mm. As the cover plate is gradually thinned, the width may be gradually reduced, for example, when the cover plate is 50 um, a width of a transparent electrode may be designed to be less than 0.05 mm.

Figure 6:
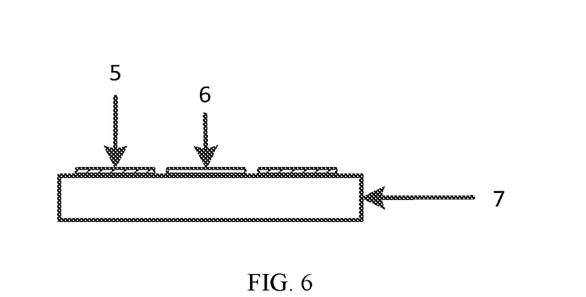
FIG. 6 is a schematic cross-sectional view of the sensor according to the present disclosure.
Figure 7:
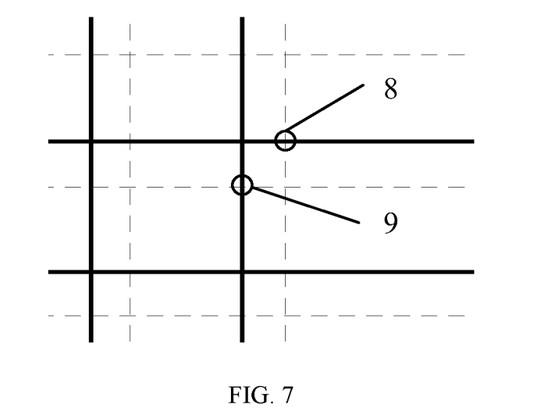
FIG. 7 is a partially enlarged schematic diagram of the touch unit in the sensor according to the present disclosure.

Further description on the sensor in this embodiment is made. The driving electrodes and the sensing circuits are arranged at the same electrode layer, with an insulating layer being arranged at an intersection between the driving electrode and the sensing electrode. Further, the driving electrodes or the sensing electrodes are bridged at the intersection. Specifically, FIG. 6 shows a vertical sectional view of the touch unit, the driving electrode 5 and the sensing electrode 6 are disposed on an electrode-attaching substrate 7. It is seen from a partial top view of the touch unit (i.e., FIG. 7) that a first intersection 8 may be a driving electrode bridge, and a second intersection 9 may be a sensing electrode bridge. An insulating layer is arranged at an intersection between two electrodes. Besides, in one touch unit, intersections between driving electrodes are electrically connected, and intersections between sensing electrodes are directly electrically connected.

Figure 8:
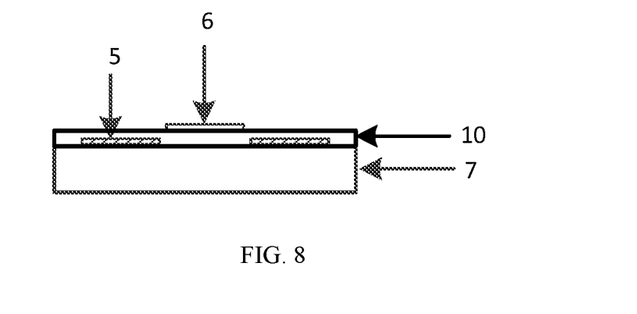
FIG. 8 is a schematic cross-sectional diagram of another sensor according to the present disclosure.

In addition, in practical applications, driving electrodes 5 in each touch unit may be arranged at a first electrode layer, and sensing electrodes 6 in each touch unit may be arranged at a second electrode layer, the first electrode layer and the second electrode layer are different electrode layers. As shown in FIG. 8, the second electrode layer is on an upper side, while the first electrode is on the lower side; the first electrode layer is covered by an insulating isolation layer 10 to isolate the upper and lower layers.

It may further be seen from FIG. 3 and FIG. 4 that an angle between the first direction and the second direction in this embodiment is 90°, but in practical applications, the first direction may not be perpendicular to the second direction. A range of the angle may be greater than or equal to 45° and less than or equal to 135°, which is not limited herein. In addition, in practical applications, there may be a third direction distinguished from the first direction and the second direction, which are not enumerated here.

Compared with the existing technology, this embodiment has the following differences and effects: touch unit is provided with a plurality of driving electrodes and a plurality of sensing electrodes, the driving electrodes are electrically interconnected to form a large driving electrode, and the sensing electrodes are electrically interconnected to form a large sensing electrode. In terms of coupling effect, each driving electrode may be coupled with other sensing electrodes, thus the coupling effect among the driving electrodes and the sensing electrodes are strengthened for the touch unit as a whole, thereby improving touch sensitivity of the sensor and of the touch screen display in the embodiment. By arranging the driving electrodes and the sensing electrodes in at least two directions respectively, more electrodes may be arranged in the same area, thereby strengthening the coupling effect and further improving the touch sensitivity. Further, this embodiment adopts a finer electrode width, which not only makes the electrode arrangement easier to be implemented, but also decreases capacitance between a human hand and the driving/sensing electrode, reducing weakening effect of a parasitic capacitance on a detection signal, decreasing capacitance between the driving/sensing electrode and a common electrode of the display screen, and lowering requirements for driving capability of a touch and control chip (IC). Further, the driving electrodes and the sensing electrodes located at the same electrode layer are bridged to avoid mis-conduction between the two types of electrodes. Besides, this embodiment further defines the layout of the electrode layers, and the driving electrodes and the sensing electrodes may be arranged in different manners to meet different requirements. The driving electrodes and the sensing electrodes that are intersected at the same electrode layer may be bridged to avoid detection mistakes caused by a connection of electrodes of two different types.

Alternately, the driving electrodes and the sensing electrodes in this embodiment are elongated-comb-tooth-shaped. It is seen that different shapes of electrodes may be used according to space for arrangement, so that the present disclosure can be applied to varied scenarios very flexibly.

Figure 9A:
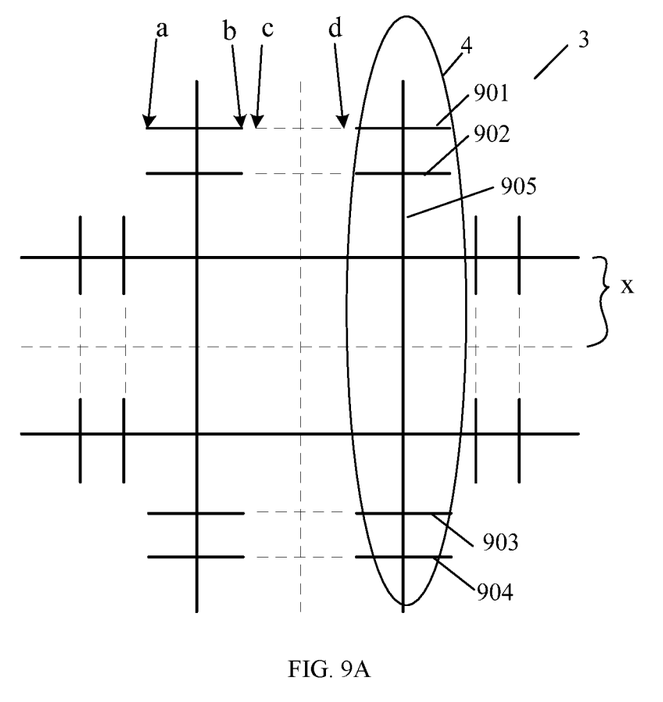
FIG. 9A is another schematic diagram of the touch unit in the sensor according to the present disclosure.

As shown in FIG. 9A, the driving electrodes (solid lines) and the sensing electrodes (dashed lines) are respectively arranged in parallel and in a comb-tooth-coupled manner. It is seen from the electrodes arranged in the vertical direction that from left to right there are a driving electrode-a sensing electrode-a driving electrode, while it is seen from the electrodes arranged in the horizontal direction that from top to bottom there are a driving electrode-a sensing electrode-a driving electrode. Taking the driving electrode 4 as an example, each driving electrode is elongated-comb-tooth-shaped, and comprises four short comb teeth 901, 902, 903, 904 and a long comb tooth 905. Similarly, the sensing electrodes are elongated-comb-tooth-shaped, and each comprises four short comb teeth and a long comb tooth. However, the number of the short comb tooth is not limited thereto, more or less short comb teeth may be set as required. With this configuration, an arrangement density of the driving electrodes and the sensing electrodes can be increased. The coupling between the elongated-comb-tooth-shaped driving electrode and sensing electrode is referred as comb-tooth-coupling.

Figure 9B:
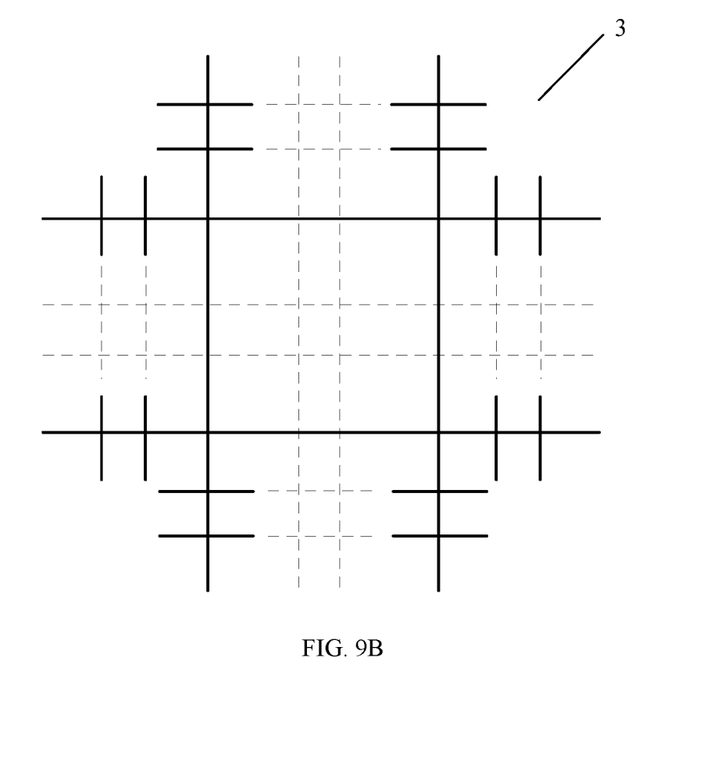
FIG. 9B is a schematic diagram of the touch unit in another sensor according to the present disclosure.

Besides, as shown in FIG. 9B, when the driving electrodes and the sensing electrodes are made of metal, the driving electrodes and the sensing electrodes may be arranged in spaces between the illuminants. That is, a distance x between electrodes are related to the resolution of the display. A display resolution refers to the number of pixels displayed in a unit area of a display, and each pixel generally is consisted of sub-pixels of the three primary colors of R (red), G (green), and B (blue).

The inventors shall explain that a coupling distance between a driving electrode and a sensing electrode closest to the driving electrode is a first distance (hereinafter referred to as "gap") which is greater than zero but smaller than or equal to a preset value. It is seen from FIG. 9A that a distance be between a driving electrode ab and a sensing electrode cd is a gap which may be 5 um. In practical applications, all gaps in one touch unit may be the same or different.

In practical applications, there may also be a touch unit as shown in FIG. 9B. It is seen from the electrodes arranged in the vertical direction that from left to right there are a driving electrode-a sensing electrode-a sensing electrode-a driving electrode, while it is seen from the electrodes arranged in the horizontal direction that from top to bottom there are a driving electrode-a sensing electrode-a sensing electrode-a driving electrode.

It is seen that this embodiment defines electrodes of different shapes, so that an electrode layout is adaptive to different requirements.

The present disclosure further relates to a touch screen display. The touch screen display specifically includes any one type of sensor described above, and a cover plate is arranged on the sensor.

In practical applications, the touch screen display may have two types of structures, as shown in FIG. 10A and FIG. 10B respectively. The touch screen display in FIG. 10A is consisted of a cover plate, a touch layer and a display layer from top to bottom. The touch layer is provided with sensors, each of which includes a plurality of touch units arranged in array; the display layer is provided with illuminants (such as LEDs), and the display layer may be a flexible display layer. In FIG. 10B, the display layer is embedded with driving electrodes and sensing electrodes, to form a touch display layer.

It shall be noted that the display layer may be a bendable flexible display layer.

The present disclosure further develops a conventional driving electrode of the touch screen display, achieving activation under a low voltage, and increasing a driving voltage.

Figure 11:
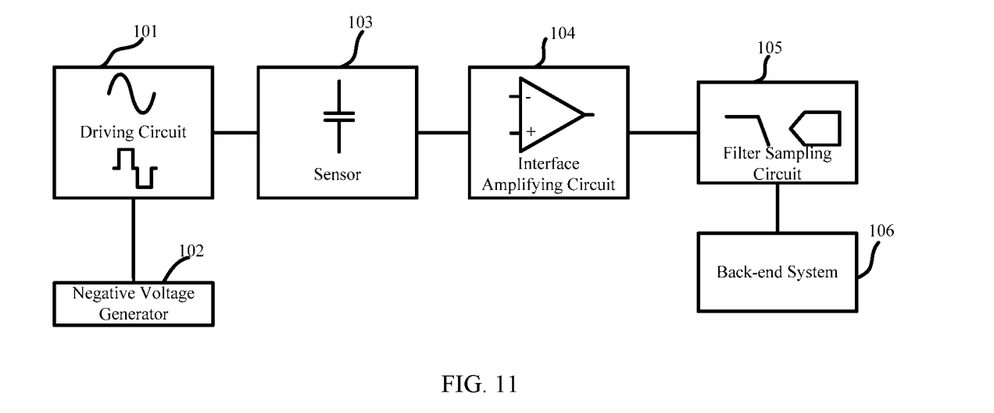
FIG. 11 is another schematic structural diagram of a detection portion of a touch screen display according to the present disclosure.

The touch screen in this embodiment specifically includes the sensor described above, and further includes a detection portion corresponding to the sensor. A system framework diagram of the detection portion is as shown in FIG. 11, mainly including a driving circuit 101, a negative voltage generator 102, a sensor 103, an interface amplifying circuit 104, a filter sampling circuit 105 and a back-end system 106. The negative voltage generator 102 provides a negative voltage to the driving circuit, the driving circuit 101 drives the sensor 103, and the sensor 103 generates a coupling signal to be transmitted to and amplified by the interface amplifying circuit 104. The amplified signal is then subjected to low-pass filtering processing and sampling by the filter sampling circuit 105 and demodulated and calculated by the back-end system 106 to obtain capacitance change information, and coordinates are reported.

Figure 12A:
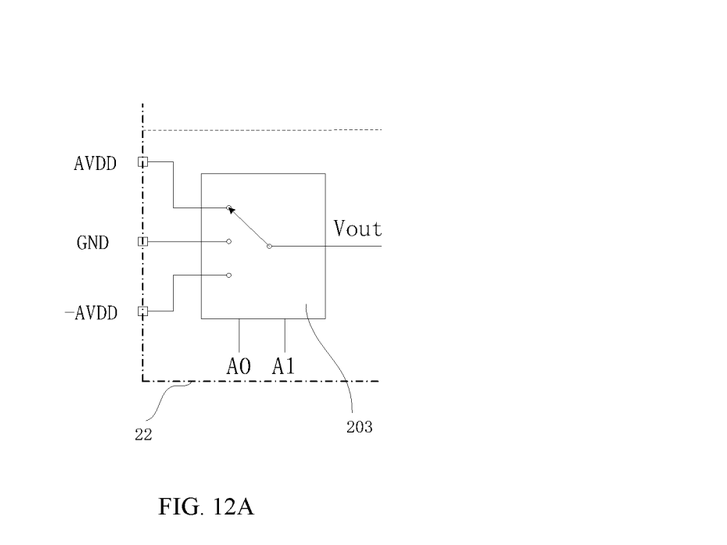
FIG. 12A is another schematic diagram of a first signal generator in the detection portion of the touch screen display according to the present disclosure.
Figure 12B:
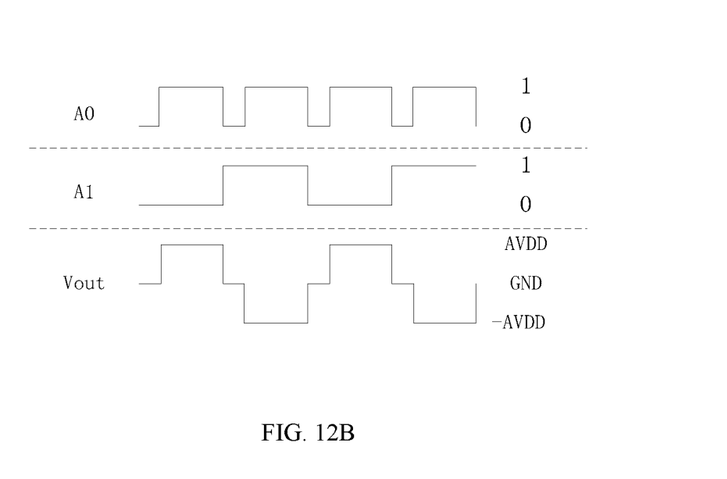
FIG. 12B is a timing diagram corresponding to the first signal generator in the detection portion of the touch screen display according to the present disclosure.

Specifically, the driving circuit 101 in the detection portion includes a first signal generator which is shown in FIG. 12A, the first signal generator specifically including a multiplexer 203 and a negative voltage generating circuit. The multiplexer 203 has an input separately connected to a power supply voltage, a ground end and an output of the negative voltage generating circuit. When the multiplexer 203 is controlled by a specific timing logic (as shown in FIG. 12B), some driving signals output by the first signal generator 22 are negative signals. In other words, a driving waveform of positive and negative voltages is achieved by outputting AVDD (i.e., a forward power supply voltage), GND (i.e., ground), and −AVDD (i.e., a negative power supply voltage) and GND by the multiplexer 203 under the control of the timing logic in the FIG. In this embodiment, the positive voltage pathway and the negative voltage pathway are switched by a switch to generate a signal similar to a square wave to drive the sensor. The negative power supply voltage (−AVDD) is generated by the negative voltage generator 102, which may be achieved based on a charge pump. In a case where there is no boosting voltage, a doubled voltage drive capability may be achieved, while a normal sinusoidal wave or a square wave generator is retained for low voltage drive to cope with application scenarios that require different signal magnitudes.

Figure 13:
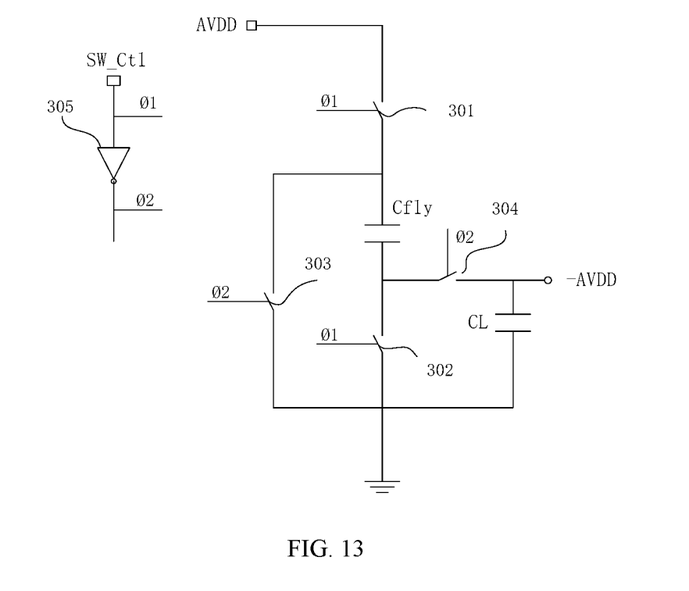
FIG. 13 is a circuit diagram of a negative voltage generating circuit in the detection portion of the touch screen display according to the present disclosure.

The negative voltage generating circuit in this embodiment is shown in FIG. 13, an inverter 305 generates a control signal Ø2 after a control signal Ø1 is input to the inverter 305. When Ø1 is a high level, Ø2 is a low level, a switch 301 and a switch 302 are turn on, a switch 303 and a switch 304 are turn off, and a capacitor Cfly is charged by a AVDD end to a maximum value (the AVDD may be used in this embodiment). When Ø1 is a low level, Ø2 is a high level, the switch 301 and the switch 302 are turn off, a switch 303 and a switch 304 are turn on, a potential difference (which may be AVDD) between two ends of the capacitor Cfly is still maintained because a charge on the capacitor Cfly cannot mutate, and thus a voltage on a capacitor CL is −AVDD.

Figure 14:
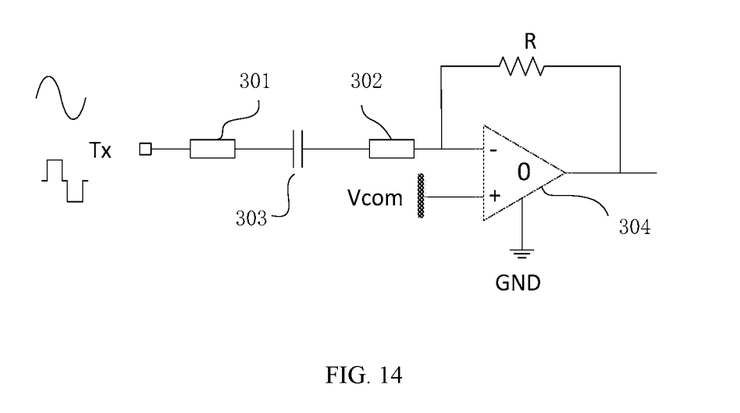
FIG. 14 is a circuit diagram of an amplifying circuit in the detection portion of the touch screen display according to the present disclosure.

A specific structure of an interface amplifying circuit in FIG. 11 is as shown in FIG. 14. A capacitor 303 is formed between a driving electrode 301 and a sensing electrode 302. A driving signal is coupled by the capacitor 303 to generate a current signal. When a hand touches nodes of the driving electrode 301 and sensing electrode 302, charges stored in the capacitor 303 change, and the current signal changes accordingly. The current signal passes through a feedback resistor R to generate a voltage signal. The signal change caused by the finger touch may be detected at an output terminal of an operational amplifier and output to a next level for processing.

It is seen that, in this embodiment, a negative pressure generator is added to achieve positive and negative voltage driving, which doubles a capacitor touch sensing signal without a boosting circuit to form an effect that is otherwise formed only by high voltage driving, as compared with the existing technology.

In the present disclosure, a low voltage driving may be added touch screen display described above, so that the two ways of driving are compatible, and detection on different signals may be achieved.

Specifically, the driving circuit in this embodiment further includes a second signal generator and a switch circuit which is configured to choose to turn on the first signal generator or the second signal generator.

Figure 15:
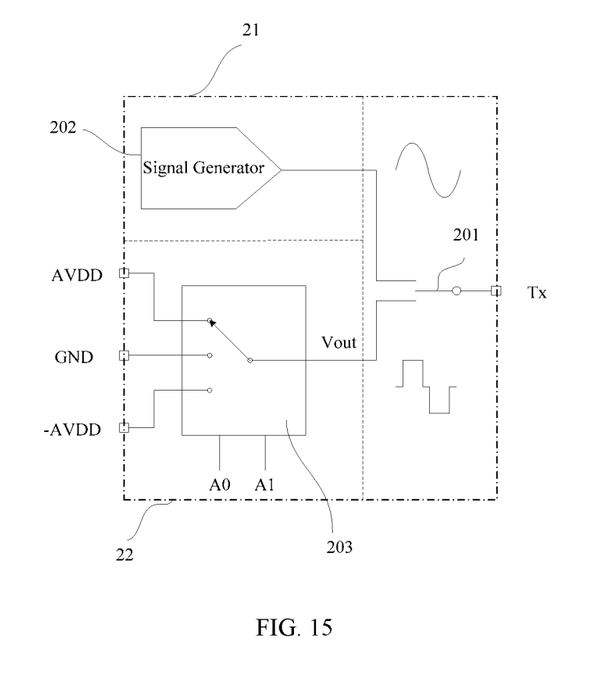
FIG. 15 is another circuit diagram of a driving circuit in a detection portion of a touch screen display in the present disclosure.

Specifically, as shown in FIG. 15, a switch 201 is used to choose a low voltage driving pathway 21 and a positive and negative voltage driving pathway 22. A low voltage driving waveform is generated by a signal generator 202, which may generate a sinusoidal signal or a square wave signal, a maximum signal amplitude of which is a power supply voltage amplitude, and an internal drive capability of which may be enhanced by a buffer. The positive and negative driving waveform is generated by the first signal generator.

In a conventional capacitance detection circuit, electrodes of a sensor are generally driven by the sinusoidal wave or square wave signal. In addition to the above-described manner, a signal detection portion in the present disclosure may otherwise be driven by a signal that is similar to the square wave and that is generated by switching the positive and negative voltage pathway with a switch, so as to drive the sensor. The negative voltage is generated by a negative voltage generator, which may be achieved based on the charge pump. A doubled voltage drive capability can be generated without boosting voltage, and a normal sinusoidal wave or square wave generator is retained to perform low-voltage driving to cope with application scenarios that require different signal magnitudes.

It is seen that the driving circuit chooses to perform low voltage drive, or positive and negative voltage drive by a two-way switch. The low voltage driving circuit may be consisted of a conventional sinusoidal wave generating circuit or a square wave generating circuit, and the positive and negative voltage driving circuit includes a negative voltage generating circuit that forms a negative voltage. The negative voltage driving circuit may be achieved by the charge pump. Positive and negative voltages are switched by the switch, and are transmitted by time-sharing to the driving electrodes of the sensor to form a positive and negative voltage waveform on the electrodes. The sensing electrode is connected to an input stage of an interface circuit. The driving signal is processed by the capacity coupling between the driving and sensing electrodes, enters the back end system to be amplified and filtered, sampled, processed and reported to a superior level.

Those skilled in the art should appreciate that the aforementioned embodiments are specific embodiments for implementing the present invention. In practice, however, many changes can be made in the forms and details of the specific embodiments without departing from the spirit and scope of the invention.

What is claimed is:

1. A sensor, comprising: a plurality of touch units, each single touch unit of the plurality of touch units comprises: a plurality of driving electrodes and a plurality of sensing electrodes;
   at least one of the driving electrodes in the single touch unit is arranged in a first direction, and another one of the driving electrodes in the single touch unit is arranged in a second direction different from the first direction;
   at least one of the sensing electrodes in the single touch unit is arranged in the first direction, and another one of the sensing electrodes in the single touch unit is arranged in the second direction;
   wherein the plurality of driving electrodes in the single touch unit are electrically connected, and the plurality of sensing electrodes in the single touch unit are electrically connected;
   wherein locations arranged for the driving electrodes and the sensing electrodes are related to locations of illuminants, and wherein the illuminants are on a display layer corresponding to the sensor;
   wherein the driving electrodes and the sensing electrodes are non-transparent layers, the driving electrodes and the sensing electrodes are arranged in spaces between the illuminants; and
   wherein a width of a driving electrode of the plurality of driving electrodes or a width of a sensing electrode of the plurality of driving electrodes is smaller than or equal to half a width of the spaces.

2. The sensor according to claim 1, wherein the driving electrodes arranged in the first direction are arranged alternately with the sensing electrodes arranged in the first direction.

3. The sensor according to claim 2, wherein the driving electrodes arranged in the second direction are arranged alternately with the sensing electrodes arranged in the second direction.

4. The sensor according to claim 2, wherein
   each of the driving electrodes arranged in the first direction is followed by one sensing electrode arranged in the first direction.

5. The sensor according to claim 2, wherein the driving electrodes in the first direction are divided into groups, and each group includes two driving electrodes; the sensing electrodes in the first direction are divided into groups, and each group includes two sensing electrodes, wherein one group of driving electrodes in the first direction is arranged between each two neighboring groups of sensing electrodes in the first direction; one group of sensing electrodes in the first direction is arranged between each two neighboring groups of driving electrodes in the first direction.

6. The sensor according to claim 3, wherein each of the driving electrodes arranged in the second direction is followed by one sensing electrode arranged in the second direction.

7. The sensor according to claim 3, wherein the driving electrodes in the second direction are divided into groups, and each group includes two driving electrodes; the sensing electrodes in the second direction are divided into groups, and each group includes two sensing electrodes, wherein one group of driving electrodes in the second direction is arranged between each two neighboring groups of sensing electrodes in the second direction, and one group of sensing electrodes in the second direction is arranged between each two neighboring groups of driving electrodes in the second direction.

8. The sensor according to claim 1, wherein the driving electrodes and the sensing electrodes in the single touch unit are strip-shaped or elongated-comb-tooth-shaped.

9. The sensor according to claim 1, wherein a coupling distance between one of the driving electrodes in the first direction and a sensing electrode arranged closest to and in the same direction as the driving electrode in the first direction is a first distance greater than zero and smaller than or equal to a preset value.

10. The sensor according to claim 9, wherein a coupling distance between one of the driving electrodes in the second direction and a sensing electrode arranged closest to and in the same direction as the driving electrode in the second direction is a first distance greater than zero and smaller than or equal to the preset value.

11. The sensor according to claim 1, wherein each of the spaces is arranged with one driving electrode and one sensing electrode.

12. The sensor according to claim 1, wherein each of the spaces is arranged with one driving electrode or one sensing electrode.

13. The sensor according to claim 1, wherein the driving electrodes are arranged at a first electrode layer, and the sensing electrodes are arranged at a second electrode layer, the first electrode layer is distinguished from the second electrode layer.

14. The sensor according to claim 1, wherein the driving electrodes and the sensing electrodes are arranged at the same electrode layer, with an insulating layer being arranged at an intersection between a driving electrode of the plurality of driving electrodes and a sensing electrode of the plurality of sensing electrodes.

15. A touch screen display, comprising a sensor, wherein the sensor comprises:
   a plurality of touch units, a single one of the plurality of touch units comprises: a plurality of driving electrodes and a plurality of sensing electrodes;
   at least one of the driving electrodes in the touch unit are arranged in a first direction, and another one of the driving electrodes in the touch unit are arranged in a second direction;
   at least one of the sensing electrodes in each touch unit are arranged in the first direction, and another one of the sensing electrodes in the touch unit are arranged in the second direction;
   wherein the plurality of driving electrodes in the touch unit are electrically connected, and the plurality of sensing electrodes in the touch unit are electrically connected;
   wherein locations arranged for the driving electrodes and the sensing electrodes are related to locations of illuminants, and wherein the illuminants are on a display layer corresponding to the sensor;
   wherein the driving electrodes and the sensing electrodes are non-transparent layers, the driving electrodes and the sensing electrodes are arranged in spaces between the illuminants; and
   wherein a width of a driving electrode of the plurality of driving electrodes or a width of a sensing electrode of the plurality of driving electrodes is smaller than or equal to half a width of the spaces.

16. The touch screen display according to claim 15, further comprising the display layer arranged with the illuminants, wherein the sensor is embedded in the display layer.

17. The touch screen display according to claim 16, wherein the display layer is a flexible display layer.

18. A sensor, comprising: a plurality of touch units, each single touch unit of the plurality of touch units comprises: a plurality of driving electrodes and a plurality of sensing electrodes;
- at least one of the driving electrodes in the single touch unit is arranged in a first direction, and another one of the driving electrodes in the single touch unit is arranged in a second direction different from the first direction;
- at least one of the sensing electrodes in the single touch unit is arranged in the first direction, and another one of the sensing electrodes in the single touch unit is arranged in the second direction; and
- wherein the plurality of driving electrodes in the single touch unit are electrically connected, and the plurality of sensing electrodes in the single touch unit are electrically connected;
- wherein the driving electrodes arranged in the first direction are arranged alternately with the sensing electrodes arranged in the first direction;
- wherein the driving electrodes in the first direction are divided into groups, and each group includes two driving electrode; the sensing electrodes in the first direction are divided into groups, and each group includes two sensing electrodes, wherein one group of driving electrodes in the first direction is arranged between each two neighboring groups of sensing electrodes in the first direction; one group of sensing electrodes in the first direction is arranged between each two neighboring groups of driving electrodes in the first direction.

19. The sensor according to claim 1, wherein a coupling distance between one of the driving electrodes in the first direction and a sensing electrode arranged closest to and in the same direction as the driving electrode in the first direction is a first distance greater than zero and smaller than or equal to a preset value.

20. The sensor according to claim 9, wherein a coupling distance between one of the driving electrodes in the second direction and a sensing electrode arranged closest to and in the same direction as the driving electrode in the second direction is a first distance greater than zero and smaller than or equal to the preset value.

* * * * *